(12) United States Patent
Thayer et al.

(10) Patent No.: US 12,010,955 B1
(45) Date of Patent: Jun. 18, 2024

(54) MULTI-POT MICRO-IRRIGATION SYSTEM AND RELATED APPARATUS AND METHODS

(71) Applicant: Thayer Industries, Inc, Dundee, FL (US)

(72) Inventors: Samuel S. Thayer, Lake Wales, FL (US); Timothy S. Geiger, Tampa, FL (US); Timothy D. Wert, Lakeland, FL (US); Kenneth H. Angstadt, Winter Haven, FL (US)

(73) Assignee: THAYER INDUSTRIES, INC., Dundee, FL (US)

( * ) Notice: Subject to any disclaimer, the term of this patent is extended or adjusted under 35 U.S.C. 154(b) by 587 days.

(21) Appl. No.: 16/798,633

(22) Filed: Feb. 24, 2020

(51) Int. Cl.
*A01G 25/02* (2006.01)
*A01G 25/16* (2006.01)

(52) U.S. Cl.
CPC ............ *A01G 25/02* (2013.01); *A01G 25/16* (2013.01)

(58) Field of Classification Search
CPC ...... A01G 25/02; A01G 25/026; A01G 25/16; A01G 27/005; A01G 9/033; A01G 9/0295; A01G 27/006; A01G 25/00; A01G 9/028; A01G 24/44; A01G 9/027; A01G 9/045; A01G 9/02–0297; A01G 9/28; B05B 15/622; B05B 1/262; B05B 15/625; B05B 15/65; B05B 3/0477; B05B 1/265; B05B 3/06; B65D 85/52
USPC ............................ 239/542, 19, 200–210, 276
See application file for complete search history.

(56) References Cited

U.S. PATENT DOCUMENTS

| | | | | |
|---|---|---|---|---|
| 3,633,826 A * | 1/1972 | Baker | ........................ | B05B 3/00 239/602 |
| 3,825,126 A * | 7/1974 | Pohl | ........................ | A01G 9/088 206/509 |
| 4,569,485 A * | 2/1986 | Walto | ........................ | B05B 1/265 239/456 |
| 4,702,034 A * | 10/1987 | Ferguson | ................ | A01G 25/02 47/33 |
| 7,469,865 B2 * | 12/2008 | Mayorga | .................. | B05B 15/65 248/156 |
| 2007/0262168 A1 * | 11/2007 | Ericksen | ................ | A01G 25/06 239/200 |

* cited by examiner

*Primary Examiner* — Joseph A Greenlund
*Assistant Examiner* — Juan C Barrera
(74) *Attorney, Agent, or Firm* — Allen, Dyer, Doppelt + Gilchrist, PA

(57) ABSTRACT

A micro-irrigation system includes at least one stake, tubing section, and micro-spray jet. The stake has a lower end configured for retention at a junction of four corners of adjacent planting pots and an upper end having a tubing retention prong and a micro-spray jet retention opening with an internal fluid passage extending therebetween. The tubing section is connected to the tubing retention prong and adapted for connection to a water supply. The micro-spray jet is connected to the retention opening, an internal fluid passage extends from the lower end to an orifice in an intermediate surface, and a splash plate is located above the jet orifice. The splash plate has a plurality of downwardly extending sides about its periphery with clearances therebetween defining a jet spray pattern. With water supplied through the tubing, at least one spray stream is directed into each of the four adjacent pots.

4 Claims, 4 Drawing Sheets

MULTI-POT MICRO-IRRIGATION SYSTEM AND RELATED APPARATUS AND METHODS

FIELD OF THE INVENTION

The present invention relates to micro-irrigation systems, and more particularly, to micro-irrigation systems including micro-spray jets used for watering of potted plants.

BACKGROUND OF THE INVENTION

Micro-irrigation systems are valuable for their ability to precisely supply a controlled, low volume of water to various types of plants. Systems using micro-sprinklers or micro-spray jets are among the most controllable and adaptable micro-irrigation systems, but delivering extremely low volume sprays (i.e., less than approximately 4 gallons per hour) to specific locations can be very challenging. The present applicant pioneered advanced micro-spray jet designs which can reliably deliver various spray patterns at these very low volumes, which volumes were previously only achievable with more limited drip irrigation systems. (See, for example, U.S. Pat. No. 5,335,859 to Thayer et al., the contents of which are herein incorporated by reference in their entirety.) Despite the benefits of micro-irrigation systems using such micro-spray jets, further improvements are possible.

SUMMARY OF THE INVENTION

Generally, a micro-irrigation system comprises a plurality of groups of rectangle-planting pots. Each group of rectangle-planting pots is arranged such that a respective corner of each rectangle-planting pot abuts a respective corner from other rectangle-planting plantings pots in a respective group to define a junction for the respective group. Each group of rectangle-planting pots is arranged such that walls from rectangle-planting plantings pots in the respective group being in contact with walls from adjacent rectangle-planting pots to define a rectangle-shaped group. The junction is centered within the rectangle-shaped group.

The micro-irrigation system also includes a plurality of irrigation devices, each irrigation device associated with the respective group of rectangle-planting pots. Each irrigation device comprises a stake body comprising a lower stake housing inserted into the junction for the respective group of rectangle-planting pots, and an upper stake housing coupled to the lower stake housing. The upper stake housing has a pair of tubing retention prongs extending laterally, a stake internal fluid passageway fluidly coupled to the pair of tubing retention prongs, the upper stake housing defining a micro-spray jet opening fluidly coupled to the stake internal fluid passageway, and internal threading at the micro-spray jet opening.

The irrigation device also includes a micro-spray jet body comprising a lower jet housing comprising a first jet end and a second jet end opposite the first jet end, and a jet internal fluid passageway extending between the first and second jet ends. The first jet end has external threading for engaging the internal threading of the stake body. The second jet end defines a jet opening opposite the stake body and is fluidly coupled to the jet internal fluid passageway. The micro-spray jet body also includes an arm extending upwardly from the lower jet housing and being laterally offset from the jet internal fluid passageway, and a splash plate body coupled to the arm and being above the jet opening. The splash plate body comprises a plate vertically aligned with the jet opening, and a plurality of fingers coupled to a periphery of the plate and extending downwardly. The plurality of fingers defines a plurality of slots therebetween to define a jet spray pattern. The micro-irrigation system comprises a plurality of tubing sections coupled to the pairs of tubing retention prongs from each of the plurality of irrigation devices and to a water supply, and a flow restriction device coupled between the water supply and the plurality of tubing sections.

DETAILED DESCRIPTION OF PREFERRED EMBODIMENTS

Figure 1:
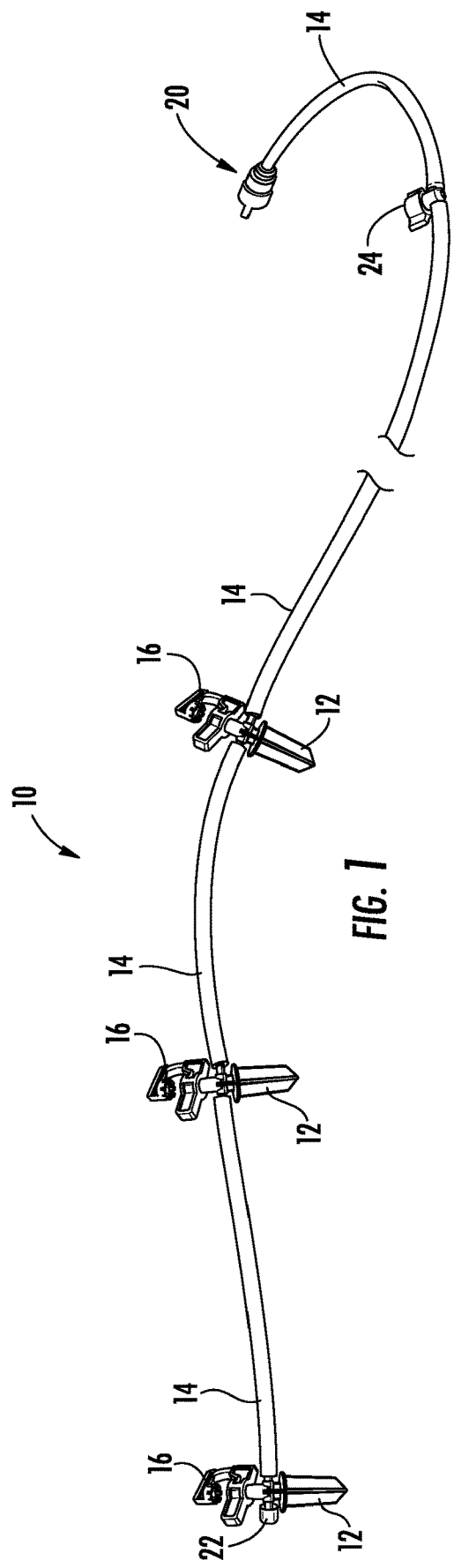
FIG. 1 is a perspective view of a micro-irrigation system, according to an embodiment of the present invention.
Figure 2:
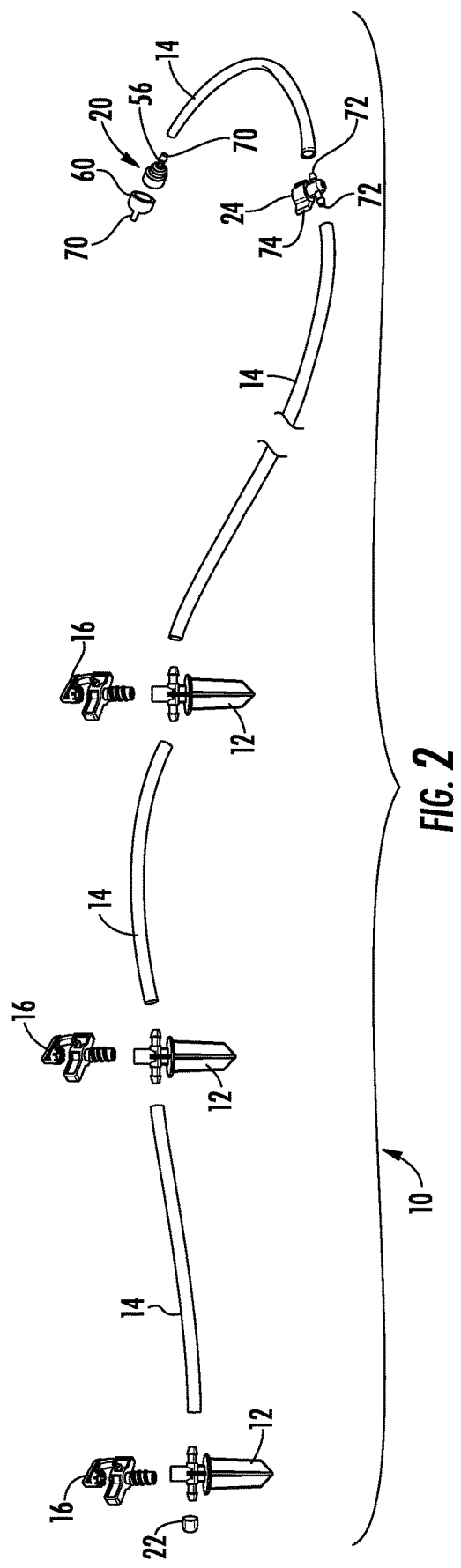
FIG. 2 is a partially exploded perspective view of the micro-irrigation system of FIG. 1.

According to an embodiment of the present invention, referring to FIGS. 1 and 2, a micro-irrigation system 10 includes a plurality of stakes 12 connected in series by a plurality of tubing sections 14, with each stake 12 having a micro-spray jet 16 thereon. A flow controller 20 is connected to a water supply end of the tubing sections 14 and an end cap 22 is connected to the stake 12 at a terminal end of the tubing sections 14. Advantageously, a shut-off valve 24 is connected between tubing sections intermediate the flow controller 20 and a first one of the stakes 12.

Figure 3:
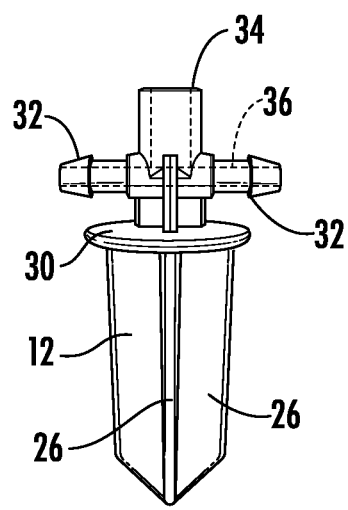
FIG. 3 is a perspective view of a stake of the micro-irrigation system of FIG. 1.

Referring to FIG. 3, each stake 12 includes lower end formed by a set of ribs 26 arranged in a cruciform pattern and terminating at a stability plate 30. Above the stability plate 30, each stake 12 has a pair of tubing retention prongs 32, which preferably extend from opposite sides thereof. Above the tubing retention prongs 32, the upper end of the stake 12 includes a micro-spray jet retention opening 34, which preferably allows self-tapping by the micro-spray jet 16 when it is first installed therein. An internal fluid passage 36 extends between the tubing retention prongs 32 and the micro-spray jet retention opening 34. Each stake 12 is preferably formed from a plastic material as a single, unitary piece.

Referring again to FIGS. 1 and 2, the tubing sections 14 are preferably flexible vinyl tubing, and most preferably ¼ inch vinyl tubing, which snugly fits over the tubing retention prongs 32. Any number of tubing sections 14 can be cut to any desired length(s) needed depending on the number and placement of stakes 12 used.

Figure 4:
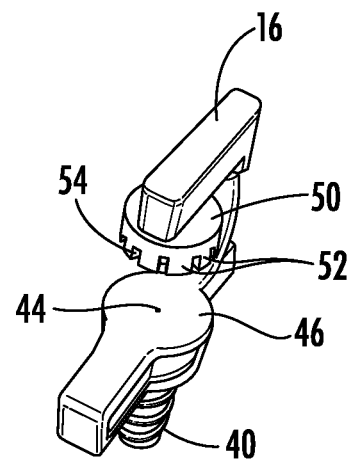
FIGS. 4 and 5 are perspective views of a micro-spray jet of the micro-irrigation system of FIG. 1.
Figure 5:
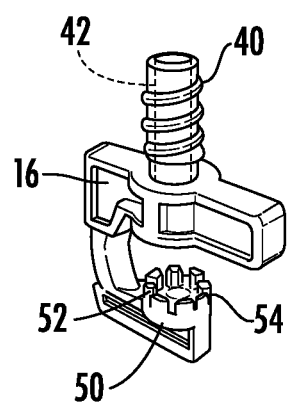

Referring to FIGS. 4 and 5, each micro-spray jet 16 has a lower end, preferably with external threads 40 to self-tap internal threads into the retention opening 34, through which an internal fluid passage 42 extends. The internal fluid passage 42 ends at an upward-facing orifice 44 in an intermediate jet surface 46. A splash plate 50 is located directly above the orifice 44 so as to receive a stream of water emitted therefrom. The splash plate 50 has a plurality of downward extending sides 52 separated by clearances 54.

Most preferably, there are eight sides 52 separated by eight clearances 54. The sides 52 and clearances 54 define a jet spray pattern for water emitted from each micro-spray jet 16. Each micro-spray jet 16 is preferably formed from a plastic material as a single, unitary piece.

Figure 6:
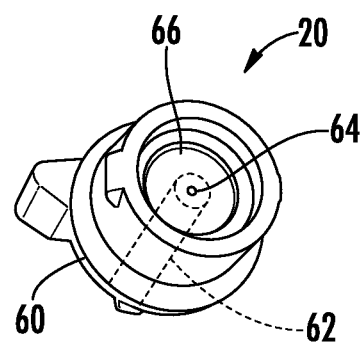
FIG. 6 is a perspective view of a flow controller of the micro-irrigation system of FIG. 1.

Referring to FIGS. 1,2 and 6, the flow controller 20 preferably includes a tubing retention section 56 (see FIG. 2) and a flow control section 60. An internal fluid passage 62 is defined extending between the ends of the flow controller 20 (the flow portion thereof being shown in broken lines in FIG. 6). A flow restricting orifice 64 is formed on an orifice plate 66 located in the fluid passage 62 within the flow control section 60 to reduce the volume of water introduced into the tubing sections 14 from the water supply. Tubing retention prongs 70 (see FIG. 2) are formed on opposite ends of the tubing retention and flow control sections 56, 60, respectively.

Referring to FIGS. 1 and 2, the end cap 22 fits snugly over the otherwise unused tubing retention prong 32 of the last stake 12 in the series to prevent water loss therefrom. The shut-off valve 24 includes a pair of tubing retention prongs 72 to snugly engage adjacent tubing sections 14. An operating handle 74 is twisted to stop and start the supply of water through the valve 24, thereby controlling the supply of water from the flow controller to the stakes 12 and micro-spray jets 16.

Figure 7:
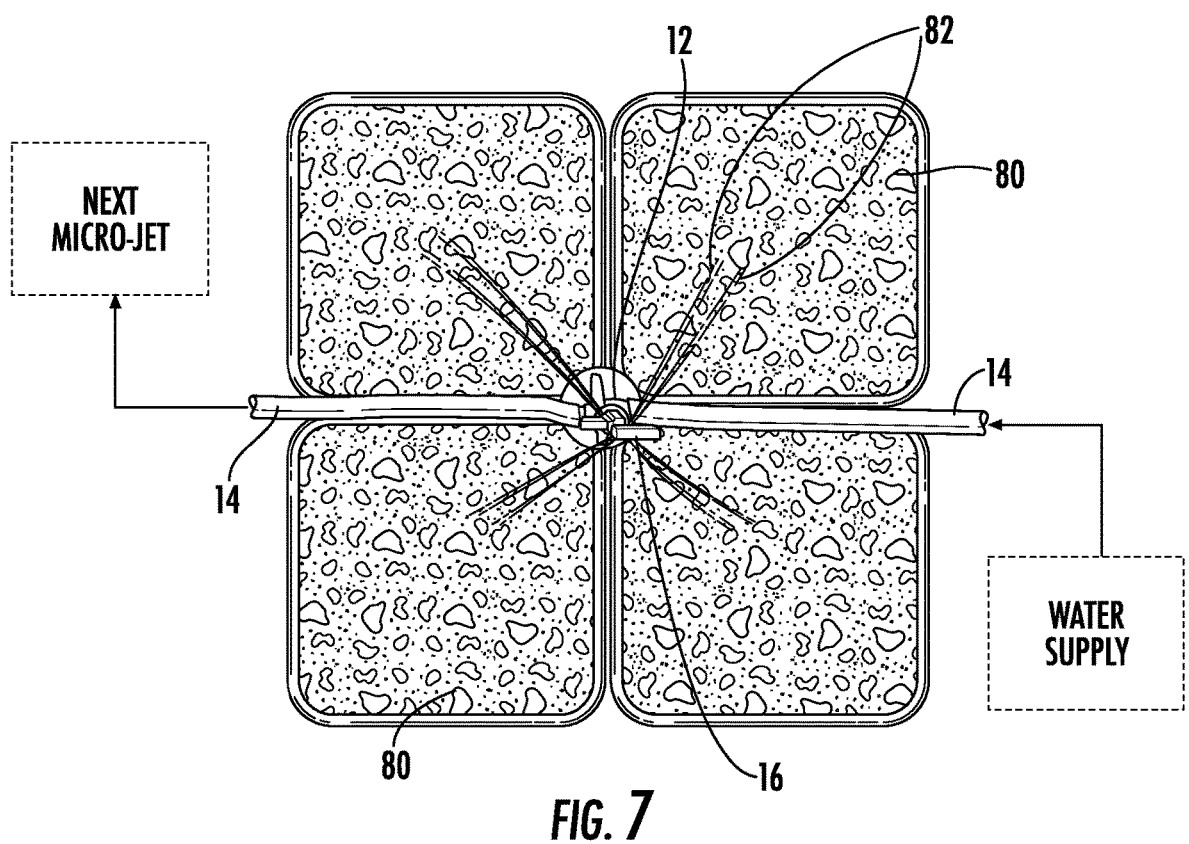
FIG. 7 is a perspective view of a portion of the micro-irrigation system of FIG. 1 in use watering four adjacent planting pots.

Referring to FIG. 7, in use, the cruciform pattern of the ribs 26 (see FIG. 3) at the bottom of each stake 12 allows it to be retained securely in the junction formed by four adjacent corners of four adjacent planting pots 80. The stability plate 30 engages the upper edges of the pots 80 when the stake 12 is fully seated. With supplied through the tubing section(s), the pattern of sides and clearances 52, 54 around the splash plate 50 (see FIGS. 4 and 5) of the micro-spray jet 16 cause two spray streams to be directed into each pot 80.

Advantageously, the respective orifices 44, 64 in the micro-spray jet 16 and the flow controller 20 are dimensioned achieve a total supply from each micro-spray jet 16 of as low as approximately 1.6 gallons per hour. As the output of each jet 16 is divided into two streams per planting pot 80, the end result is an accurate and controlled supply of as low as approximately 0.4 gallons per hour to each pot 80. By simply varying the flow controller used (and more particularly, the size of the orifice therein), the flow to each pot could be varied between approximately 0.4 gallons per hour to 3.0 gallons per hour.

In addition to being an extremely low volume supplied via a micro-spray jet, the spray pattern achieved by each jet 16 yields streams that are wide enough to avoid soil digging and allow better water break-up and movement around each pot 80. When used outdoors, the spray pattern also remains consistent in windy conditions.

In general, the foregoing description is provided for exemplary and illustrative purposes; the present invention is not necessarily limited thereto. Rather, those skilled in the art will appreciate that additional modifications, as well as adaptations for particular circumstances, will fall within the scope of the invention as herein shown and described and of the claims appended hereto.

What is claimed is:

1. A micro-irrigation system comprising:
    a plurality of groups of rectangle-planting pots, each group of rectangle-planting pots arranged such that
        a respective corner of each rectangle-planting pot abuts a respective corner from other rectangle-planting plantings pots in a respective group to define a junction for the respective group, and
        walls from rectangle-planting plantings pots in the respective group being in contact with walls from adjacent rectangle-planting pots to define a rectangle-shaped group, the junction being centered within the rectangle-shaped group;
    a plurality of irrigation devices, each irrigation device associated with the respective group of rectangle-planting pots and comprising
        a stake body comprising
            a lower stake housing inserted into the junction for the respective group of rectangle-planting pots, and
            an upper stake housing coupled to the lower stake housing, the upper stake housing having
                a pair of tubing retention prongs extending laterally,
                a stake internal fluid passageway fluidly coupled to the pair of tubing retention prongs, the upper stake housing defining a micro-spray jet opening fluidly coupled to the stake internal fluid passageway, and
                internal threading at the micro-spray jet opening, and
        a micro-spray jet body comprising
            a lower jet housing comprising a first jet end and a second jet end opposite the first jet end, and a jet internal fluid passageway extending between the first and second jet ends, the first jet end having external threading for engaging the internal threading of the stake body, the second jet end defining a jet opening opposite the stake body and being fluidly coupled to the jet internal fluid passageway,
            an arm extending upwardly from the lower jet housing and being laterally offset from the jet internal fluid passageway, and
            a splash plate body coupled to the arm and being above the jet opening, the splash plate body comprising
                a plate vertically aligned with the jet opening, and
                a plurality of fingers coupled to a periphery of the plate and extending downwardly, the plurality of fingers defining a plurality of slots therebetween to define a jet spray pattern;
    a plurality of tubing sections coupled to the pairs of tubing retention prongs from each of the plurality of irrigation devices and to a water supply; and
    a flow restriction device coupled between the water supply and the plurality of tubing sections.

2. The micro-irrigation system of claim 1, wherein the lower stake housing includes a plurality of ribs extending outwardly.

3. The micro-irrigation system of claim 2, wherein the lower stake housing includes a horizontally extending stability plate extending outwardly and above the plurality of ribs.

4. The micro-irrigation system of claim 2, wherein the plurality of ribs is arranged in a cruciform pattern.

* * * * *